UNITED STATES PATENT OFFICE.

FREDERICK G. NIEDRINGHAUS AND WILLIAM F. NIEDRINGHAUS, OF ST. LOUIS, MISSOURI.

IMPROVEMENT IN THE MANUFACTURE OF ENAMELED IRON-WARE.

Specification forming part of Letters Patent No. 177,953, dated May 30, 1876; Reissue No. 7,779, dated July 3, 1877; application filed September 28, 1876.

*To all whom it may concern:*

Be it known that we, FREDERICK G. NIEDRINGHAUS and WILLIAM F. NIEDRINGHAUS, residents of the city of St. Louis, State of Missouri, have invented a new and useful Improvement in Enameling Iron-Ware, of which the following is a full, clear, and exact description:

The present invention relates to an improvement in enameling sheet-iron ware, by means whereof a beautifully mottled and more durable enamel is obtained. We do this by causing an oxidation of the metallic base during the enameling process. The preferable way of doing this, in practice, is by omitting the washing of the metal in the alkaline bath after it has, for the purpose of cleansing it, been immersed in the acid bath, and by utilizing the acid which forms an element in the enameling-glaze to oxidize the metal.

The procedure, more particularly described, is as follows: The metal is cleaned, in the usual way, in an acid bath; then, without employing an alkali bath, it is, after the usual scouring to remove the scale, placed in clear water, and allowed to remain, say, at least, half an hour, and so as to remove the acid. As soon as it taken from the water it is immediately coated with a liquid glaze and placed in the drying-room, where the glaze is slowly dried thereon.

The appearance and character of the enamel are determined during this drying of the glaze, as according to the length of the time taken in the drying, and to the temperature of the drying-room, will be the amount of oxidation. No definite rule can be given for either as the process is affected by many circumstances—as, for instance, the humidity of the atmosphere. The ware must be carefully watched during the process, and the temperature and time regulated by the appearance of the ware.

We prepare our glaze from the ordinary ingredients, taking care to have the ingredients mixed and thoroughly smelted together in bulk to expel all carbon and other elements that would impede oxidation, and in order that the acid in the glaze may have free action. They are then ground in water and applied in the usual way.

Now, by reason of the presence of the acid of the glaze, an oxidation of the metallic base takes place freely during the drying process, and appearing in and throughout the glaze as reddish spots. This causes the enamel, when it is finally formed in the usual way by baking the ware in the oven, to assume the desired mottled appearance. By reason of this oxidation the enamel, also, is caused to enter the pores of the iron, and become more intimately incorporated with the metal, thus rendering the enamel more durable.

To illustrate more clearly our process we will give the exact formula of the glaze with which a certain batch of our ware was enameled, and the mode of preparing and applying the glaze, not intending, however, to confine ourselves to the precise quantities named in the formula, or to the exact times and temperatures specified in connection with the various steps in the application of the glaze, but simply to show clearly how our result can be obtained.

We took of pure silica, one hundred pounds; of nitrate of soda, ten pounds; of carbonate of soda, thirty pounds; of carbonate of potassa, ten pounds; of borax, fifty pounds; of manganese, eight pounds. All these ingredients were mixed and thoroughly smelted, as above stated, and then ground in water for ten hours, adding the usual proportion of clay—in this instance six pounds. This constituted the glaze, in which the iron goods, prepared as above specified, were dipped. When the goods were taken from the glaze-bath they were at once placed in the drying-room, (where a temperature of 125° Fahrenheit was maintained,) and allowed to remain there about four hours, when they were thoroughly dried. They were then placed in the baking-oven for about eight minutes, the oven meanwhile being at the ordinary temperature. This produced a mottled enamel of a brownish appearance. The color, however, may be changed at pleasure—as, for instance, to produce a mottled enamel of a bluish tint, we would substitute two pounds of oxide of cobalt in place of the manganese; and to produce a white tint any of the coloring agents known to enamelers may be used, for our process does not preclude the use of any of the coloring agents.

Another way of measurably accomplishing these ends, when the use of the ordinary alkali bath is retained, is by increasing the quantity of the boracic, and lessening the alkaline fluxes in the composition of the glaze, sufficient to overcome the alkali and oxidize the metal; and the character of the mottling is affected by the amount of acid present in the glaze when applied to the ware; also, if a mottling of smaller spots is desired, we increase the boracic and lessen the alkaline fluxes in the glaze, as the size of the spots will be determined by the amount of acid in the glaze, or upon the freedom with which the acid is allowed to act.

What we claim is—

1. The herein-described process of enameling iron-ware by oxidizing the iron during the process of drying the glaze, substantially as set forth.

2. As a new manufacture mottled enameled sheet-iron ware, having the oxidized base fused with the surface-glaze.

F. G. NIEDRINGHAUS.
WM. F. NIEDRINGHAUS.

Witnesses:
SAML. S. BOYD,
CHAS. D. MOODY.